United States Patent Office.

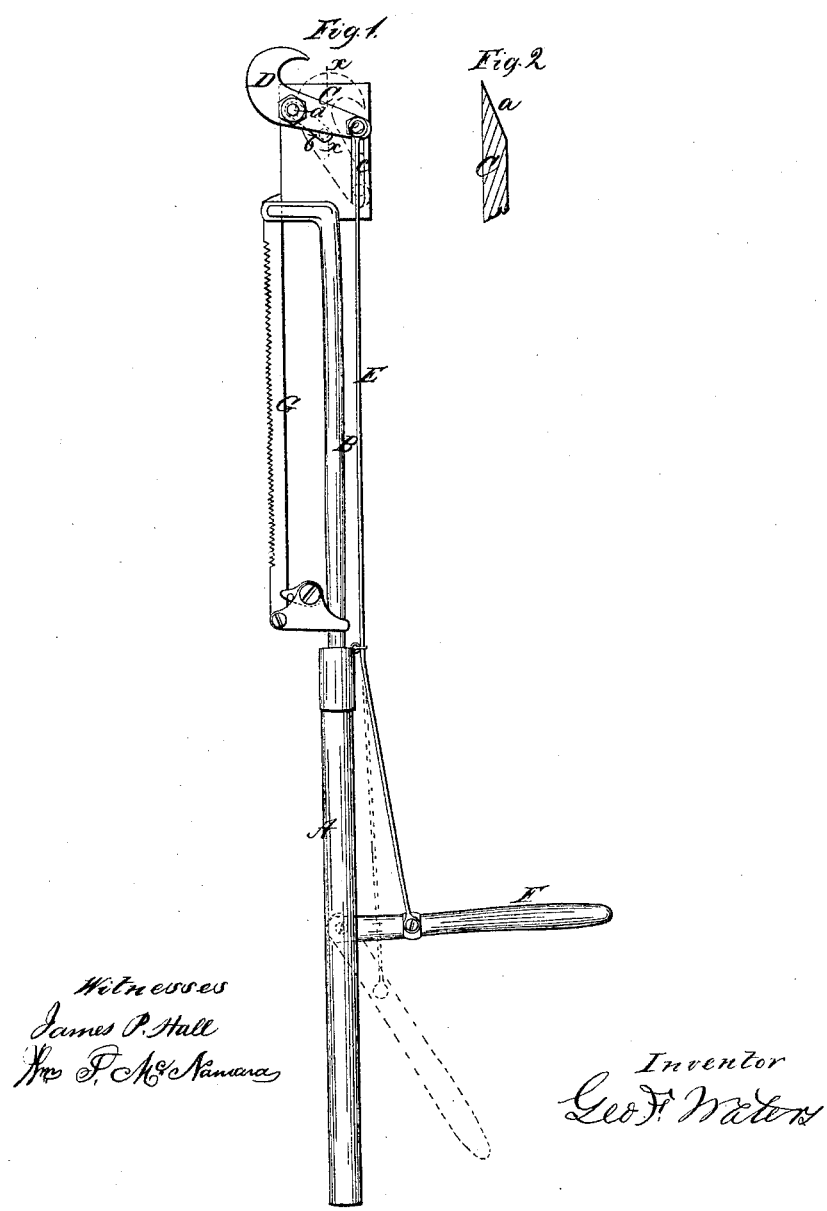

GEORGE F. WATERS, OF WATERVILLE, MAINE.

IMPROVEMENT IN PRUNING-SHEARS.

Specification forming part of Letters Patent No. 45,196, dated November 22, 1864.

*To all whom it may concern:*

Be it known that I, G. F. WATERS, of Waterville, in the county of Kennebec and State of Maine, have invented a new and Improved Pruning-Shears; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, an enlarged longitudinal section of the upper part of the chisel pertaining to the same, *x x*, Fig. 1, indicating the line of section.

Similar letters of reference indicate like parts.

This invention consists in the employment or use of a fixed chisel-shaped cutter in connection with a knife of curved form arranged and applied in such a manner as to operate with a curved drawing cut and perform the work with greater facility than the ordinary pruning-shears in use.

A represents a handle, which may be of wood, and B is a metal rod of any desired length fitted securely in the handle, and having a cutter, C, at its end of chisel form, the cutting-edge being formed by a bevel, *a*, at one side, as shown in Fig. 2. This cutter is formed out of a flat steel plate of proper dimensions or an iron plate having a steel edge, and said plate has two slots, *b c*, made in it, one slot, *b*, having a diagonal position, and the other slot, *c*, having a position parallel or nearly so with the sides of the cutter-plate, as shown clearly in Fig. 1.

D is a knife, which is of curved or hook form, as shown in Fig. 1, and has a pin or pivot, *d*, passing through it, said pin or pivot also passing through the oblique or diagonal slot *b*, and retained therein by a head at one end and a nut on the other end, the pin or pivot being allowed to slide freely in the slot, and the inner end of said knife has a pin or pivot, *e*, passing through it, which also passes through the slot *c* and is allowed to work freely therein, said pin being retained in the slot by a head at one end and a nut on the opposite end. By this arrangement it will be seen that by operating the knife D a circular drawing cut will be given it, and the twig or branch between the cutter C and knife D will be cut or severed with but a slight exertion or effort on the part of the operator. The knife C is represented as being actuated by a rod, E, attached to the inner end of the knife and extending toward the handle A and connected to a lever, F, the inner end of which is pivoted to the handle. I do not, however, confine myself to this means for actuating the knife, for various plans may be devised for that purpose according to the size of the implement and the particular purpose for which it may be designed—that is to say, whether constructed for short hand shears for trimming small shrubs or for large shears capable of trimming trees and large shrubs.

In large implements, a saw, G, may be attached to the rod B, which will prove very convenient for sawing off branches too large to be cut with the shears.

I would remark that in lieu of the slot C a guide-arm may be used for the inner part of the knife C to work on. This, however, would be an equivalent of the slot *c*, the same end or result being attained in either case.

I claim as new and desire to secure by Letters Patent—

A pair of pruning-shears composed of a fixed chisel-shaped cutter, C, and a curved knife, D, applied to the plate of the cutter C, constructed substantially as shown, so as to operate with a curved drawing cut, as described.

GEO. F. WATERS.

Witnesses:
JAMES P. HALL,
WM. F. MCNAMARA.